3,027,412
PRODUCTION OF 4,4'-METHYLENEBIS-
(6-TERT-BUTYL-O-CRESOL)
Eric B. Hotelling, Westport, Conn., and Martin B. Neuworth and Edward P. Previc, Pittsburgh, Pa., assignors to Consolidation Coal Company, Pittsburgh, Pa., a corporation of Pennsylvania
Filed July 3, 1959, Ser. No. 824,895
5 Claims. (Cl. 260—619)

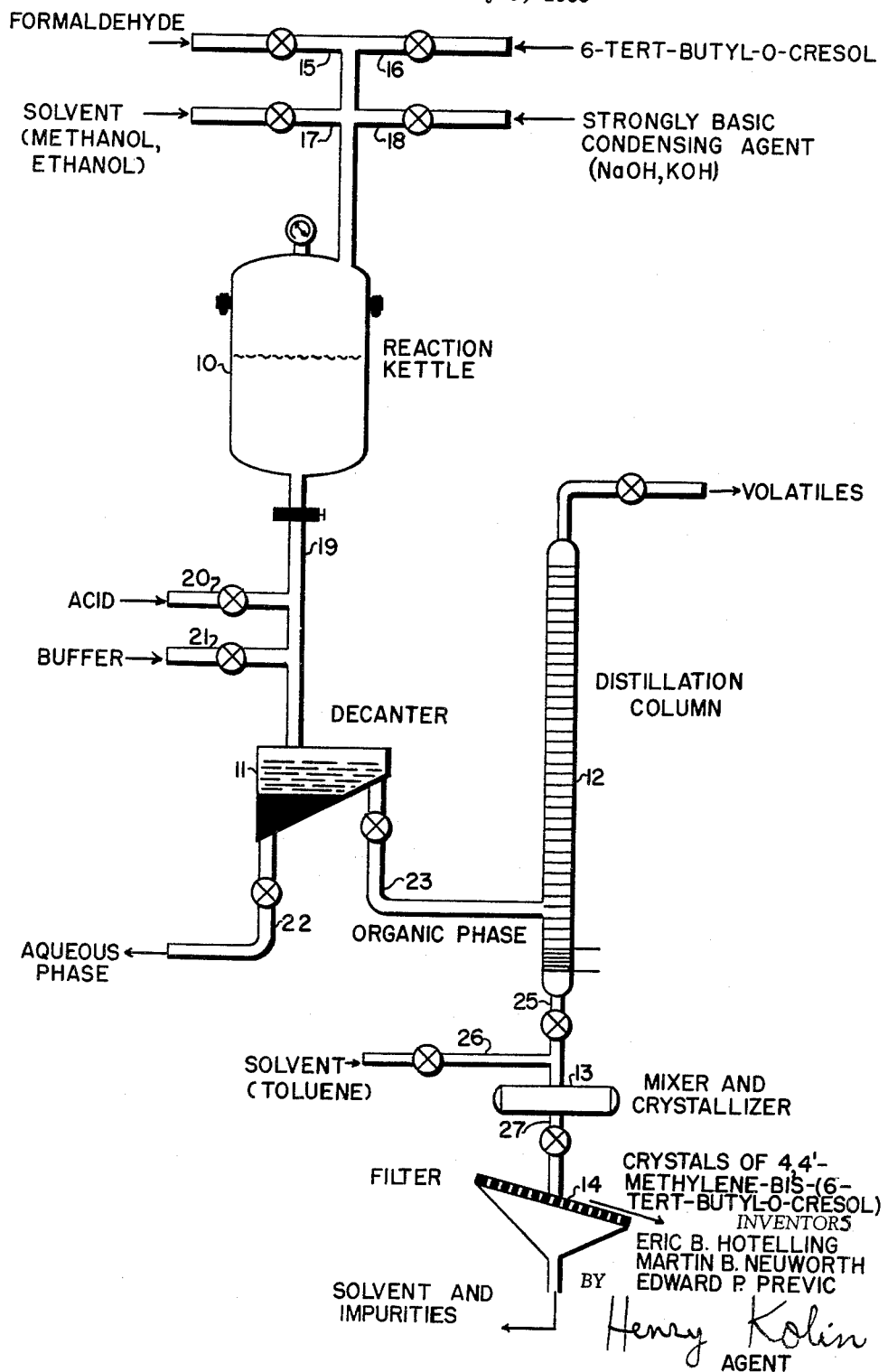

This invention relates to a method for the preparation of 4,4'-methylenebis(6-tert-butyl-o-cresol). More particularly it relates to the preparation of this compound from 6-tert-butyl-o-cresol in high yield and in a high degree of purity.

The compound 4,4'-methylenebis(6-tert-butyl-o-cresol) possesses valuable antioxidant properties in various organic compounds such as hydrocarbon fuels, lubricants, rubbers and synthetic polymers.

Related bisphenols have been prepared heretofore by condensing formaldehyde with phenol in the presence of various catalysts. Where a methylenebisphenol of the 2,2'-type is desired, one such suitable procedure employs an acidic condensing agent such as hydrochloric acid with a small quantity of mercaptoacetic acid. The use of an acidic condensing agent is unsatisfactory, however, for preparing 4,4' - methylenebis(6 - tert - butyl-o-cresol), with which the present invention is concerned. Poor conversion and low yield result, and the recovered product is generally impure.

Granger et al. have suggested (Ind. Eng. Chem., vol. 24, pages 442–446, 1932) the use of an alkaline condensation agent for preparing 4,4'-methylenebisphenols. They mix phenol, formaldehyde and aqueous sodium hydroxide and allow a reaction to occur. However, when their procedure is attempted with a highly hindered phenol such as 6-tert-butyl-o-cresol, no reaction occurs. Thus we combined one mole of 6-tert-butyl-o-cresol with 0.65 mole of formaldehyde and 0.2 mole of sodium hydroxide in water. The mixture was maintained at 97° C. under reflux for two hours. The 6-tert-butyl-o-cresol was almost quantitatively recovered, indicating that no 4,4'-methylenebisphenol product was obtained.

It has also been suggested, in U.S. Patent 2,807,653, that di(3,5-dialkylhydroxyphenyl)methanes may be obtained by reacting 2,4- or 2,6-dialkylphenols with an aldehyde having from 1 to 10 carbon atoms in the presence of a catalytic quantity of an alkali metal hydroxide catalyst and in a solvent consisting of a monohydric alcohol having from 1 to about 8 carbon atoms. A preferred solvent consists of isopropyl alcohol. This patent further teaches that the amount of alkali metal hydroxide catalyst used should be about 0.5 to about 3 percent by weight based on the weight of the phenol used in conducting the process. The patent further teaches that it is essential in order to obtain satisfactory yields that there not be present more than catalytic quantities, as defined, of the alkali metal hydroxide. Otherwise, the yield of product may be reduced because of ether formation involving participation of the alcohol solvent. It is further stated that if insufficient alcohol solvent is employed, the yield of product is also diminished.

Somewhat surprisingly, we have found that, contrary to these teachings of the prior art, 4,4'-methylenebis-(6-tert-butyl-o-cresol) may be obtained in enhanced yield of greater than 90 percent and in improved purity by reacting 6-tert-butyl-o-cresol with formaldehyde in the presence of only macrocatalytic amounts of catalyst and in the presence of an alcohol selected only from methanol and ethanol. The reaction is preferably performed at a temperature between 100 and 125° C. in a closed system. By the term "macrocatalytic quantities," from 0.2 to 0.5 mole of a strongly basic condensing agent per mole of 6-tert-butyl-o-cresol is contemplated. Furthermore, it has been found that by using these macrocatalytic quantities of catalyst, the use of excess alcohol solvent may be avoided. The only amount of alcohol required is that sufficient to solubilize the mixture of 6-tert-butyl-o-cresol, formaldehyde and catalyst. An amount of alcohol equivalent in weight to the starting weight of 6-tert-butyl-o-cresol is sufficient to accomplish this solubilization. On a theoretical basis, considering the alcohol to participate as an intermediate in the reaction, an equimolar amount of alcohol may be sufficient.

The formaldehyde employed in the present invention can be in any of the readily available forms such as formalin or paraformaldehyde. A 40 percent solution of formaldehyde in water is generally convenient and preferred. At least one-half mole of formaldehyde is reacted for each mole of starting phenol. A slight excess of formaldehyde above this stoichiometric quantity is generally preferred.

A strongly basic condensing agent must be employed in the present process. Alkali metal hydroxides, such as sodium, potassium and lithium hydroxides, are preferred. It is essential that the condensing agent be completely soluble in the reaction mixture. While lower quantities of alkali metal hydroxide may be employed, this deleteriously affects the yield and product purity. In order to obtain maximum yields of 4,4'-methylenebis(6-tert-butyl-o-cresol) in a high degree of purity, about 0.2 to 0.5 mole of the alkali metal hydroxide, per mole of 6-tert-butyl-o-cresol, must be used. Conveniently, the condensing agent may be added as a concentrated aqueous solution, e.g., in 50 percent concentration. To achieve the high yields and purity obtained herein, a quantity of methanol or ethanol only, sufficient to solubilize the reaction mixture consisting of 6-tert-butyl-o-cresol, formaldehyde, and the alkali metal hydroxide catalyst, is used. Higher boiling alcohols such as isopropyl alcohol, butyl alcohol, isobutyl alcohol, and glycols are unsatisfactory decreased yields being obtained therewith. The preferred alcohol solvent is denatured ethanol. In general, a weight of denatured ethanol equal to that of the starting 6-tert-butyl-o-cresol will be sufficient to solubilize the reaction mixture.

The reaction mixture, solubilized to a single homogeneous liquid phase, is maintained at a temperature from 75 to 150° C. for a sufficient period of time to complete the condensation reaction. A holdup time of about two hours is sufficient. It is particularly preferred to perform the reaction at a temperature of 100 to 125° C. in order to maximize the yield. Temperatures below the preferred range are undesirable because of the slower reaction rate. Higher reaction temperatures, particularly above 150° C., are undesirable because of the occurrence of side reactions.

The liquid reactants preferably are maintained in a closed system during reaction. We have found that conduction of the reaction in a closed system greatly improves the yield over that obtained in an open system.

By the term "closed system" we mean that the reactants are confined and are prevented from escaping into the surrounding atmosphere during the reaction treatment.

Following completion of the condensation reaction, a quantity of mineral acid such as sulfuric or hydrochloric acid is used to neutralize the strongly basic condensing agent. The resulting pH of the reaction mixture should be somewhat higher than 7, for example between 7 and 9. It may be convenient after addition of acid, in order to insure stoichiometric neutralization of the strongly basic condensing agent, to thereafter add a buffer solution such as sodium carbonate to maintain the pH of the reaction slightly above the value of 7. Following neutralization, the two phases are separated. The heavier aqueous phase contains water, dissolved salts, some alcohol and some formaldehyde. The supernatant organic phase contains unreacted phenols, some alcohol and the desired 4,4'-methylenebis(6-tert-butyl-o-cresol), as well as some intermediate condensation product such as methylols and some formaldehyde. The organic phase is distilled to remove the distillate of volatile materials including any unreacted 6-tert-butyl-o-cresol, formaldehyde, alcohols and the like.

The desired 4,4'-methylenebis(6-tert-butyl-o-cresol) can be recovered from the distillation residue. Inasmuch as 4,4'-methylenebis(6-tert-butyl-o-cresol) is crytallizable, it may be conveniently obtained by crystallization from a hydrocarbon solvent such as hexane, benzene, toluene or the like.

Other objects and features of this invention may be more fully understood from the following description taken in conjunction with the sole FIGURE of the drawing which illustrates a flow diagram showing apparatus adapted to carry out the process of this invention.

Referring to the drawing, the principal apparatus shown includes a reaction kettle 10, a decanter 11, a distillation column 12, a mixer and crystallizer 13, and a filter 14. Formaldehyde is conveniently introduced through a valved conduit 15, 6-tert-butyl-o-cresol through a valved conduit 16, methanol or ethanol through a valved conduit 17, and a strongly basic condensing agent such as sodium hydroxide or potassium hydroxide in a 50 percent solution through a valved conduit 18. In a typical run, one mole (164 grams) of 6-tert-butyl-o-cresol, one-half mole of formaldehyde, 0.25 mole of sodium hydroxide as a 50 percent solution, and 165 grams of ethanol are introduced into the reaction kettle 10. The reaction mixture, solubilized to a single homogeneous liquid phase, is maintained in the reaction kettle at a temperature between 100 and 125° C. for approximately two hours.

Following completion of the condensation reaction, the liquid reaction product is withdrawn from the reaction kettle 10 through a valved conduit 19. Hydrochloric acid is added through a valved conduit 20 in sufficient quantity to neutralize the strongly basic condensing agent. Following neutralization, a buffer solution of sodium carbonate is added through a valved conduit 21, to maintain the pH of the reaction product slightly above a value of 7.

The neutralized reaction products are then introduced into the decanter 11 where a phase separation occurs. The heavier aqueous phase is withdrawn through a valved conduit 22. The supernatant organic phase is withdrawn through a valved conduit 23. The organic phase is distilled in the distillation column 12 to remove a distillate fraction of volatile materials. The distillation residue is recovered through a valved conduit 25 and contains the desired 4,4'-methylenebis(6-tert-butyl-o-cresol), together with high-boiling impurities.

Toluene is introduced through a valved conduit 26 as a solvent for the impurities. The mixture of solvent and distillation residue is mixed, cooled, and allowed to crystallize in the mixer and crystallizer 13. The crystallizable 4,4'-methylenebis(6-tert-butyl-o-cresol) forms crystals of highly pure material. The resulting slurry is withdrawn through a valved conduit 27 and filtered in a filter 14 to separate the crystals of pure 4,4'-methylenebis(6-tert-butyl-o-cresol) from the solvent containing high-boiling impurities as solute.

I. EFFECT OF TEMPERATURE

To illustrate the effect of reaction temperature in the present process, a series of runs was completed in which a molar proportion of 6-tert-butyl-o-cresol was reacted with 0.65 mole of formaldehyde in the presence of 0.2 mole of sodium hydroxide. This corresponds to 4.9 weight percent of sodium hydroxide based on the starting 6-tert-butyl-o-cresol. Denatured ethyl alcohol was employed to solubilize the reaction mixture. Each of the runs was carried out in a closed system. The results are shown in Table I.

*Table I.—Effect of Temperature*

| Run | Temperature, °C. | Pressure, p.s.i.g. | Yield, wt. percent based on alkylphenol feed | Melting point of product, °C. |
|---|---|---|---|---|
| A | 82 | 0 | 83 | 101.5–104 |
| B | 100 | 15 | 87 | 111.5–113.5 |
| C | 125 | 45 | 86 | 112–113 |
| D | 150 | 140 | 78 | 108.5–110 |

In run D, 0.5 mole of formaldehyde was used. The melting point of pure 4,4'-methylenebis(6-tert-butyl-o-cresol) is 112–113° C. The yield was calculated by dividing the moles of 4,4'-methylenebis(6-tert-butyl-o-cresol) by one-half the number of moles of 6-tert-butyl-o-cresol initially charged, expressed as a percentage.

As shown in Table I, the yield of desired 4,4'-methylenebis(6-tert-butyl-o-cresol) is maximized in the temperature range 100 to 125° C. Further, in this temperature range the product is virtually chemically pure as illustrated by the melting point analysis.

II. EFFECT OF SOLVENT

To illustrate the effect of solvent in the present reaction system, seven runs were conducted in which a molar proportion of 6-tert-butyl-o-cresol was reacted with 0.65 mole of formaldehyde in the presence of 0.2 mole of sodium hydroxide. Pure 4,4'-methylenebis(6-tert-butyl-o-cresol) was obtained. Table II illustrates the conditions and results of these runs.

*Table II.—Effect of Solvent*

| Run | Temperature, °C. | Solvent | Pressure, p.s.i.g. | Yield, wt. percent based on alkylphenol feed | Melting point of product, °C. |
|---|---|---|---|---|---|
| E | 250 | None | 200 | 0 | |
| F | 97 | Water | 0 | 0 | |
| G | 100 | Methanol | 25 | 76 | 109.5–113 |
| B | 100 | Ethanol | 15 | 87 | 111.5–113.5 |
| H | 100 | Isopropyl alcohol | 10 | 44 | 109–112 |
| I | 100 | Isobutyl alcohol | 5 | 4 | 105–110 |
| J | 150 | Triethylene glycol | 0 | 0 | |

The yield was calculated as in Table I. In run J, 0.5 mole for formaldehyde was employed and the sodium hydroxide was used in the form of dry pellets. They remained undissolved in the reaction mixture and were identifiable at the completion of the run.

Inspection of Table II illustrates that denatured ethanol and methanol are suitable solvents in the presnt process. Even though solubilization resulted from the isopropyl alcohol and isobutyl alcohol runs, the yield of product was unsatisfactory. In runs E and F the starting 6-tert-butyl-o-cresol was almost quantitatively recovered where, respectively, no solvent and water as solvent were employed. In run J, where triethylene glycol was used as solvent, none of the desired 4,4'-methylenebis(6-tert-butyl-o-cresol) was detected in the reaction product.

III. EFFECT OF CONDENSING AGENT

As can be seen from runs E and J of Table II, the condensing agent must be dissolved in the reaction mixture in the present process. A series of four runs was conducted with sodium hydroxide as the condensing agent and using ethanol as the solvent. 6-tert-butyl-o-cresol was reacted with formaldehyde at 100° C. in a closed system in each of the runs. The sodium hydroxide was added as a 50 percent (by weight) solution in water. The results of these runs are shown in Table III.

*Table III.—Effect of Condensing Agent*

| Run | Formaldehyde, Mole Percent | Sodium Hydroxide | | Yield, wt. Percent based on alkylphenol feed | Melting Point of Product |
|---|---|---|---|---|---|
| | | Mole Percent | Weight Percent | | |
| K | 50 | 5 | 1.2 | 62 | 100 –101 |
| L | 50 | 20 | 4.9 | 76 | 107.5–110.5 |
| M | 65 | 50 | 12.2 | 93 | 108 –111 |
| N | 75 | 50 | 12.2 | 95 | 107 –111 |
| O | 50 | 100 | 24.4 | 74 | 109.5–113 |
| P | 65 | (KOH) 20 | 6.8 | 84 | |

Yields and melting point were determined as for Table I. In run P, the condensing agent used was potassium hydroxide, as indicated.

From inspection of Table III it is apparent that the present process produces high yields of the desired 4,4'-methylenebis(6-tert-butyl-o-cresol) when the condensing agent is at least about 20 mole percent. It is particularly preferred, as is evident from the table, to use from 0.2 to 0.5 mole of catalyst based on a molar proportion of the starting 6-tert-butyl-o-cresol. As shown in runs M and N, yields in excess of 90 percent of high purity product were obtained. These results were surprising in view of the teaching of the prior art that increasing the quantity of condensing agent beyond ordinary catalytic amounts results in a decreased yield and a product of lower purity. Precisely the opposite results were found compared with this teaching of the prior art. On the other hand, as shown in run O, increasing the quantity of condensing agent to 100 mole percent results in a decreased yield.

A run made following exactly the teachings of the prior art resulted in a product of relatively poor yield and increased impurity compared with the results obtained herein. Thus, to a mixture consisting of 164 grams (1 mole) of 6-tert-butyl-o-cresol, 6.6 grams (4.0 weight percent or 12 moles percent, based on 6-tert-butyl-o-cresol) of solid potassium hydroxide as catalyst, and 400 grams of isopropyl alcohol was added 45.5 grams of a 40 percent aqueous formaldehyde solution (12 mole percent in excess of theoretical) over a ten-minute period at room temperature. The mixture was heated to 60° C. and maintained at that temperature for 2½ hours. It was then poured into 1500 milliliters of cold water, thereby forming a slurry. The desired product was extracted with ether from the slurry, the ether layer was dried over calcium chloride, and the ether was then evaporated to yield the desired 4,4'-methylenebis(6-tert-butyl-o-cresol) in 76 percent yield based on the charged material. Its melting point was 97.5–100.5° C., indicating a relatively impure product.

While we do not wish to be limited by the following speculative mechanisms proposed, it is believed that the process shown in the prior art and the instant process differ essentially in kind with respect to the predominant reaction involved in each process. In the prior art process, catalytic quantities of condensing agent are used, and the alcohol is considered not to be critical for the process. When using catalytic quantities of condensing agent, essentially a direct condensation is considered to take place. Such a condensation (to minimize dealkylation) proceeds best at relatively low temperatures, that is, from about 20 to 100° C. and preferably between 50 and 60° C. The alcohol serves merely to solubilize the reactants. In applicants' process, however, by employing from 20 to 50 mole percent of condensing agent, i.e., using macro quantities, a two-stage reaction is believed to occur. In the first stage, ether formation occurs, preceding condensation. The ether thereafter condenses with a mole of the alkylphenol to form the desired product, regenerating the alcohol. Thus while the prior art process may use an alcohol other than methanol or ethanol, such as isopropyl alcohol for example, in the instant process, which uses macro quantities of the basic condensing agent, it has been found that very poor yields of products are obtained when isopropyl alcohol is used as the solvent. For higher alcohols, the yield in the instant process is essentially negligible. It has been found that methanol and ethanol will form ethers with formaldehyde and phenols, whereas isopropyl alcohol and higher alcohols form such ethers with considerable difficulty or not at all. Thus in our process the ethanol or methanol is considered to take part in the reaction rather than only serving to solubilize the reactants. Hence the process is particularly sensitive to the choice of alcohol used; only methanol or ethanol may be used for obtaining maximum yields of high-purity product. At the low temperatures used in the prior art, ethers formed will be relatively stable, and hence will constitute undesired side reaction products interfering with the yield and purity of the desired bisphenol. However, in this invention, in addition to using macro quantities of basic material, which it is believed promote ether formation, a relatively elevated reaction temperature is also used. At these temperatures the ethers formed are considered to condense with the alkylphenols and hence would not remain as undesired stable side reaction products.

Although we have specifically illustrated and described our invention with respect to its best embodiment, we desire to have it understood that subject to the limitations herein contained, as indicated by the scope of the appended claims, the invention may be practiced other than as specifically illustrated and described.

We claim:

1. The method for preparing 4,4'-methylenebis(6-tert-butyl-o-cresol) in a yield of at least 90 percent based on 6-tert-butyl-o-cresol initially charged, which comprises dissolving a molar proportion of 6-tert-butyl-o-cresol, about 0.5 mole of formaldehyde, and about 0.5 mole of sodium hydroxide in an amount of ethanol equivalent to the weight of 6-tert-butyl-o-cresol, heating the resulting solution in a closed system to a temperature in the range of 100 to 125° C. for not more than two hours to effect condensation, neutralizing the reaction product and recovering 4,4'-methylenebis(6-tert-butyl-o-cresol) as a distillation residue therefrom in a yield of at least 90 percent based on 6-tert-butyl-o-cresol.

2. The method for preparing 4,4'-methylenebis(6-tert-butyl-o-cresol) which comprises dissolving a molar proportion of 6-tert-butyl-o-cresol, at least 0.5 mole of formaldehyde, and about 0.2 to 0.5 mole of an alkali metal hydroxide condensing agent in an alcohol selected from the class consisting of methanol and ethanol, heating the resulting solution in a closed system to a temperature in the range of 100 to 125° C. for a sufficient period to effect condensation, neutralizing the reaction product, and recovering 4,4'-methylenebis(6-tert-butyl-o-cresol) as a distillation residue therefrom.

3. The method of claim 2 in which the alkali metal hydroxide condensing agent is sodium hydroxide.

4. The method for preparing 4,4'-methylenebis(6-tert-butyl-o-cresol) which comprises dissolving a molar proportion of 6-tert-butyl-o-cresol, about 0.5 to 0.75 mole of formaldehyde, and about 0.2 to 0.5 mole of an alkali metal hydroxide condensing agent in an alcohol selected from the class consisting of methanol and ethanol, between about one molar proportion of alcohol and an amount of alcohol equivalent to the starting weight of the 6-tert-butyl-o-cresol being used, heating the resulting solution in a closed system to a temperature in the range of 100 to 125° C. for a sufficient period to effect condensation, neutralizing the reaction product, and recovering 4,4'-methylenebis(6-tert-butyl-o-cresol) as a distillation residue therefrom.

5. The method according to claim 4 wherein the alkali metal hydroxide is sodium hydroxide and the alcohol is ethanol.

References Cited in the file of this patent

UNITED STATES PATENTS

| | | |
|---|---|---|
| 2,807,653 | Filbey et al. | Sept. 24, 1957 |
| 2,841,623 | Norton et al. | July 1, 1958 |

OTHER REFERENCES

Ambelang et al., Jour. Amer. Chem. Soc., vol. 75 (1953), pp. 947–50.